United States Patent [19]

Nieh

[11] Patent Number: 4,710,362
[45] Date of Patent: Dec. 1, 1987

[54] SELECTIVE RECOVERY OF CARBON DIOXIDE

[75] Inventor: Edward C. Y. Nieh, Austin, Tex.

[73] Assignee: Texaco Inc., White Plains, N.Y.

[21] Appl. No.: 859,560

[22] Filed: May 5, 1986

[51] Int. Cl.⁴ .................... C01B 17/16; C01B 31/20
[52] U.S. Cl. ........................................ 423/228; 423/6
[58] Field of Search ...................... 423/226; 564/505

[56] References Cited

U.S. PATENT DOCUMENTS

| | | | |
|---|---|---|---|
| 4,344,863 | 8/1982 | Robbins et al. | 423/228 |
| 4,362,856 | 12/1982 | Kluger | 564/505 |
| 4,392,866 | 7/1983 | Sung et al. | 564/505 |
| 4,392,867 | 7/1983 | Sung et al. | 564/505 |
| 4,436,891 | 3/1984 | Umeda et al. | 564/505 |

Primary Examiner—John Doll
Assistant Examiner—Lori S. Freeman
Attorney, Agent, or Firm—Jack H. Park; Kenneth R. Priem; Carl G. Ries

[57] ABSTRACT

Carbon dioxide is selectively removed from an acid gas stream containing carbon dioxide and sulfur-containing components including hydrogen sulfide by counter-currently contacting the acid gas stream with an aqueous solution of a treating agent in order to selectively absorb carbon dioxide from the gas stream, the treating agent being an aqueous solution of a polyoxypropylene triamine having the formula:

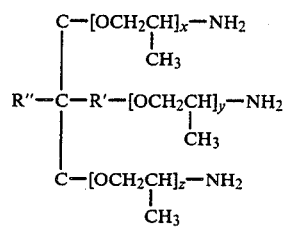

wherein R' represents a methylene group and R" represents hydrogen or methyl or ethyl and wherein the sum of $x+y+z$ is a positive integer having a value of from about 4 to about 6.

5 Claims, No Drawings

SELECTIVE RECOVERY OF CARBON DIOXIDE

TECHNICAL FIELD OF THE INVENTION

This invention relates to a method for the substantially selective removal of carbon dioxide from a gas stream containing carbon dioxide and hydrogen sulfide, such as an acid gas stream obtained by the removal of acid gases from a stream of hydrocarbon gas by a nonselective acid gas removal process. It is common practice to treat a hydrocarbon gas stream, such as a tail gas stream from a refinery operation, a natural gas stream, a synthesis gas stream, etc., counter-currently in an absorption zone with an aqueous solution of a treating agent which will remove substantially all of the acid gases such as carbon dioxide, hydrogen sulfide, etc., from the hydrocarbon gas stream. It is frequently desirable to separate the hydrogen sulfide from the carbon dioxide in such a stream in order to more effectively use the carbon dioxide in a secondary oil field recovery operation and/or in order to provide a gas stream rich in hydrogen sulfide for a feedstock for a sulfur recovery unit such as a Clauss unit. In accordance with the present invention, the acid gas stream from a nonselective acid gas absorption process is further counter-currently contacted with a particular class of polyoxypropylene triamines in order to substantially selectively remove the carbon dioxide from the acid gas stream by counter-current acid extraction in the manner known to those skilled in the art.

DESCRIPTION OF THE PRIOR ART

Applicant is not aware of prior art disclosing amine selective for $CO_2$ recovery (i.e., the amines are either non-selective or are $H_2S$ selective.

This is illustrated, for example, in an article by F. C. Vidaurri and R. C. Ferguson, entitled "MDEA Used in Ethane Purification" in Proc. of the 1977 Gas Cond. Conf., University of Oklahoma, Norman, Okla., which describes an experimental procedure used to measure the relatively high selectivity of methyldiethanolamine (MDEA) for $H_2S$ as compared with its lower selectivity for $CO_2$, and the use of MDEA in a commercial process for the substantially (but not entirely) selective removal of $H_2S$ from a mixture of $H_2S$ with $CO_2$.

Appl et al. U.S. Pat. No. 4,336,233 discloses a process for the removal of $CO_2$ and/or $H_2S$ from a gas stream by scrubbing the gas stream with an aqueous solution of methyldiethanolamine and piperazine.

The relative solubilities of hydrogen sulfide and carbon dioxide in aqueous solutions of N-methyldiethanolamine is reported in an article by Fang-Yuan Joe et al. entitled "Solubility of $H_2S$ and $CO_2$ in Aqueous Methyldiethanolamine Solutions" (*Ind. Eng. Chem. Proccess Des. Dev.*, Volume 21, No. 4, 1982, pgs. 539-544).

The use of "Sterically Hindered Amines for $CO_2$ Removal from Gases" has been disclosed by Sartori et al. (*Ind. Eng, Chem. Fundam.*, 1983, 22, 239-249).

An article entitled "Purified $CO_2$ with a Low-Energy Process" (*Meissner, Energy Progress,* Volume 4, No. 1, March 1984, pgs. 17-21) describes a cyclic process for removing hydrogen sulfide from carbon dioxide streams to be used for enhanced crude oil recovery wherein the gas treating agent that is used is an aqueous solution of N-methyldiethanolamine with triethanolamine.

Sykes U.S. Pat. No. 3,965,244 discloses a process wherein an acid gas stream containing $H_2S$, $CO_2$ and COS, obtained from a liquid absorption process is treated in two steps. In the first step, the acid gas stream is heated at an elevated temperature in the presence of an aqueous polyalkanolamine solution containing tetramethylene sulfone in order to convert the COS to $H_2S$ and $CO_2$. In the second step, the resultant mixture of $H_2S$ and $CO_2$ is contacted with an alkanolamine absorbent selective for $H_2S$ in order to separate the $H_2S$ from the $CO_2$. Suitable selective solvents are described as including alkyl dialkanolamines such as methyldiethanolamine, triethanolamine, dipropanolamine, amines such as di-n-propanolamine or diisopropanolamine.

BACKGROUND OF THE INVENTION

Many hydrocarbon streams such as natural gas streams, refinery processing gas streams (e.g., tail gas streams), synthesis gas streams, etc., are contaminated with sulfur-containing acid gases such as hydrogen sulfide, sulfur dioxide, mercaptans, sulfides, carbon dioxide, etc. It is important to remove the acid gas impurities from such streams in order to enhance their utility and also to avoid environmental pollution. It is common practice to use a liquid absorption process to remove the acid gases wherein a solvent, such as an alkanolamine, which has a selective absorption capacity for the acid gases is brought into counter-current contact with the gas stream to be treated on a continuous basis in an absorption zone. The at least partially purified gas stream is discharged from the absorption zone for further processing while the solvent, rich in absorbed gases, is discharged from the absorption zone and then charged to a regeneration zone wherein the acid gases are removed from the rich solvent solution to thereby provide a lean solvent solution for recycle to the absorption zone and a stream of desorbed acid gases.

It is frequently desirable to use the desorbed stream of acid gases, when they are rich in sulfur, as a feedstock for the production of elemental sulfur in an appropriate processing unit such as a Clauss unit. It is also frequently desirable to use carbon dioxide for a secondary hydrocarbon recovery process.

In accordance with the present invention, a process is provided for separating the carbon dioxide from the sulfur-containing acid gas components, principally $H_2S$, in order to enhance the utility of the carbon dioxide stream for use in secondary recovery operations and in order to enhance the value of the sulfur-containing stream as a feedstock for a Clauss unit.

DESCRIPTION OF THE PREFERRED EMBODIMENT

In accordance with the present invention, a process is provided for selectively separating carbon dioxide from an acid gas stream containing carbon dioxide and sulfur-containing acidic gases, particularly hydrogen sulfide. The process of the present invention is a selective absorption process wherein the acid gas stream is brought into counter-current contact in an absorption zone with an absorbent selective for the absorption of carbon dioxide. An off-gas stream, having a significantly reduced carbon dioxide content is discharged from the absorption zone for use, for example, as a feedstock for a sulfur recovery unit and a solvent stream rich in absorbed carbon dioxide is discharged from the absorption zone and then charged to a regeneration zone wherein the carbon dioxide is freed from the solvent in order to provide a lean solvent solution for recycle to the absorption zone and a stream consisting essentially of carbon dioxide for use, for example, in a secondary petroleum hydrocarbon recovery operation.

It has been surprisingly discovered in accordance with the present invention that a restricted class of polyoxypropylene triamines has a high selectivity for carbon dioxide when used as a selective solvent in order to separate carbon dioxide from sulfur-containing acid gases and in particular, from hydrogen sulfide.

The triamines to be used in accordance with the present invention are those having the general formula as follows:

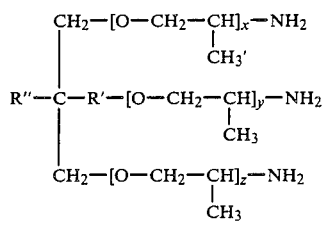

wherein R' represents a methylene group and R" represents hydrogen or methyl or ethyl and wherein the sum of $x+y+z$ is a positive integer having a value of from about 4 to about 6. Specific examples of compounds having the formula are listed below:

| Approximate Avg. mol wt. | PRODUCT R" | $x + y + z$ |
|---|---|---|
| 440 | $CH_3CH_2-$ | ≈5.3 |
| 426 | $CH_3-$ | 4 to 6 |
| 414 | H— | 4 to 6 |

The polyoxypropylene triamine absorbent of the present invention should be used in an aqueous solution such as an aqueous solution having an amine concentration of about 2.5 to about 3.5 meq/g. This corresponds to an aqueous solution containing about 35% to about 55 wt. % of the polyoxypropylene triamine.

The feedstocks to be treated in accordance with the present invention are those containing both carbon dioxide and hydrogen sulfide although other acid gas components may be present. Such a feedstream, for example, may be obtained by the nonselective absorption of acid gases from a gaseous hydrocarbon process stream such as a natural gas stream, a synthesis gas stream or a refinery tail gas stream in a manner known to those skilled in the art.

The feedstream, which contains both carbon dioxide and hydrogen sulfide, is treated with the aqueous solution of the polyoxypropylene triamine of the present invention in the conventional manner known to those skilled in the art by counter-currently contacting the feed gas stream with a stream of the aqueous solution of polyoxypropylene triamine in a gaseous absorption zone to provide a treated gas stream enriched in hydrogen sulfide and containing a significantly reduced amount of carbon dioxide and an aqueous solution rich in absorbed carbon dioxide which is charged in the conventional fashion to a desorption zone wherein the carbon dioxide is desorbed from the aqueous solution and polyoxypropylene triamine to provide an off-gas consisting essentially of carbon dioxide and a regenerated polyoxypropylene triamine stream to be recycled to the absorption zone.

Absorption in the absorption zone may suitably be conducted at about 20° to about 50° C.

Desorption in the desorption zone may suitably be conducted at about 80° to about 130° C.

EXAMPLES

The invention will be further illustrated by the following specific examples which are given by way of illustration and not as limitation on the scope of this invention.

EXAMPLE 1

In order to demonstrate the efficacy of the present invention, for the selective removal of carbon dioxide, a number of experiments were performed in a specially designed apparatus which was similar in construction and operation to the bench scale test apparatus used by Vidaurri and Ferguson for their experimental studies (Vidaurri and Ferguson, "MDEA Used in Ethane Purification", supra).

The apparatus for measuring absorption rate consists of (A) one liter stainless steel vessel, (B) 500-ml stirring autoclave, (C) 60 psig Heise gauge, (D) 60 psig and 30 inch Hg vacuum compound Heise gauge, (E) 0–40 psig Sensotec model 811/1083 pressure transducer connected to a Kipp and Zenon strip chart recorder, (F) ball valve and (H) needle valves.

Preparations for a run were made by charging 250-ml amine solution into the autoclave (B) followed by evacuating the vapor space to 24 inches of Hg pressure. The stirrer was adjusted 450±2 rpm and the autoclave was immersed in one gallon of water at ambient temperature during a run. The gas vessel (A) was pressurized to 46.0 psig with acid gas (ca. $H_2S$ or $CO_2$).

A run was made by opening the ball valve (F) and allowing acid gas to expand into the evacuated autoclave. To minimize disturbance of the vapor-liquid interphase, the initial pressure drop, as indicated by gauge (C), was limited to no greater than one psig per second by the partially open needle valve (G). Subsequent pressure dropped, resulting from the acid gas being absorbed into the amine solution. This was recorded on a strip chart recorder. From the slope of the recorder trace, the absorption rate in terms of psig per second can be readily calculated.

For each amine, absorption rates for several different concentrations were measured. The selectivity factor for any given concentration can be calculated by:

$$\text{Selectivity Factor} = \frac{k_1}{k_2}$$

where $k_1$ is the absorption rate for carbon dioxide and $k_2$ is the absorption rate for hydrogen sulfide. The results of Examples 1–11 are listed in Table I.

TABLE I
SELECTIVITY STUDIES

| # | Acid Gas | Amine Reagent | Absorption Rate × 10⁻² psig/sec Weight Percent Amine Concentration | | | | | | | | Selectivity Factor[a] at 2.5 meq/g |
|---|---|---|---|---|---|---|---|---|---|---|---|
| | | | 5 | 10 | 15 | 20 | 30 | 40 | 50 | 60 | |
| 1a | $H_2S$ | Monoethanolamine | 3.40 | 5.00 | 6.00 | 6.80 | — | — | — | — | 0.35 |
| 1b | $CO_2$ | Monoethanolamine | 1.40 | 1.90 | 2.10 | 2.00 | — | — | — | — | |
| 2a | $H_2S$ | Diisopropanolamine | — | 1.50 | — | 2.06 | 2.38 | — | — | — | 0.52 |
| 2b | $CO_2$ | Diisopropanolamine | — | 1.18 | — | 1.14 | 1.10 | — | — | — | |
| 3a | $H_2S$ | Diethanolamine | — | 3.10 | — | 3.40 | 3.53 | 3.06 | — | — | 0.53 |
| 3b | $CO_2$ | Diethanolamine | — | 1.03 | — | 1.59 | 2.02 | 2.18 | — | — | |
| 4a | $H_2S$ | Triethanolamine | — | 2.40 | — | 2.60 | 2.50 | 1.85 | — | — | 0.45 |
| 4b | $CO_2$ | Triethanolamine | — | 0.52 | — | 0.67 | 0.90 | 0.90 | — | — | |
| 5a | $H_2S$ | 2-methyl-2-aminopropanol | — | 3.40 | — | 3.50 | 3.13 | — | — | — | 0.44 |
| 5b | $CO_2$ | 2-methyl-2-aminopropanol | 1.02 | 1.14 | — | 1.34 | 1.47 | — | — | — | |
| 6a | $H_2S$ | N—methyldiethanolamine | — | 2.88 | — | 3.20 | 3.80 | 4.10 | — | — | 0.25 |
| 6b | $CO_2$ | N—methyldiethanolamine | — | 0.62 | — | 0.85 | 0.97 | — | — | — | |
| 7a | $H_2S$ | JEFFAMINE ® D-230 | — | 4.24 | — | 6.46 | 7.80 | 8.43 | — | — | 0.23 |
| 7b | $CO_2$ | JEFFAMINE ® D-230 | — | 1.25 | — | 1.65 | 1.83 | 1.85 | — | — | |
| 8a | $H_2S$ | JEFFAMINE ® D-400[b] | — | 2.58 | — | 3.20 | 3.88 | 3.85 | 2.86 | — | 0.42 |
| 8b | $CO_2$ | JEFFAMINE ® D-400[b] | — | 0.89 | — | 1.05 | 1.13 | 1.32 | 1.21 | — | |
| 9a | $H_2S$ | JEFFAMINE ® T-403[c] | — | 2.50 | — | 3.73 | 4.35 | 3.21 | 1.68 | — | 1.35 |
| 9b | $CO_2$ | JEFFAMINE ® T-403[c] | 0.80 | 0.80 | — | 1.70 | 2.75 | 4.69 | 4.88 | — | |
| 10a | $H_2S$ | JEFFAMINE ® D-230 4EO[d] | — | 2.90 | — | 3.28 | 3.68 | 2.86 | 1.83 | 1.33 | 0.18 |
| 10b | $CO_2$ | JEFFAMINE ® D-230 4EO[d] | — | — | — | 0.50 | 0.61 | 0.42 | 0.33 | 0.22 | |
| 11a | $H_2S$ | JEFFAMINE ® D-230 4PO[e] | — | 2.87 | — | 3.00 | 2.78 | 2.54 | 1.54 | 0.09 | 0.78 |
| 11b | $CO_2$ | JEFFAMINE ® D-230 4PO[e] | — | — | — | 0.61 | 0.56 | 0.34 | 0.22 | 0.07 | |

FOOTNOTES FOR TABLE I

[a] Selectivity factors were calculated from absorption rates at 2.5 M amine concentration.

[b] 

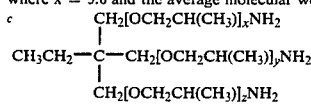

where x = 5.6 and the average molecular weight is about 400.

[c]

$$\begin{array}{c} CH_2[OCH_2CH(CH_3)]_xNH_2 \\ | \\ CH_3CH_2-C-CH_2[OCH_2CH(CH_3)]_yNH_2 \\ | \\ CH_2[OCH_2CH(CH_3)]_zNH_2 \end{array}$$

where x + y + z = 5.3 and wherein the average molecular weight is about 440.

[d] A four mole ethoxylate of the compound of footnote [b].

[e] A four mole propoxylate of the compound of footnote [b].

Note from Table I that the use of the polyoxypropylene triamine of the present invention in Examples 9a and 9b resulted in a significant selective absorption of carbon dioxide, the selectivity factor being 1.35. In contrast, structurally similar diamines in Examples 7a and b, 8a and b, 10a and b, and 11a and b had significantly lower selectivity factors ranging from 0.23 to about 0.78.

Examples 1-6 represent the results obtained using alkanolamines of the type suggested by the prior art and, again, the selectivity factors are only about 0.5 at best.

What is claimed is:

1. In a method for the selective separation of carbon dioxide from a stream of acid gas containing carbon dioxide and sulfur-containing acid gas components including hydrogen sulfide the improvement which comprises the steps of:

countercurrently contacting said gas stream in an absorption zone with a treating agent to thereby selectively remove a substantial portion of the carbon dioxide from said gas stream by absorption into said treating agent, discharging a gas stream from said absorption zone containing a significantly reduced amount of carbon dioxide and discharging said treating agent enriched with absorbed carbon dioxide from said absorption zone, said treating agent being an aqueous solution containing from about 35 wt. % to about 55 wt. % of a polyoxypropylene triamine having the formula:

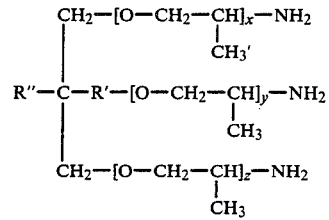

Wherein:
   R' represents a methylene group and R" represents hydrogen or methyl or ethyl and wherein the sum of x+y+z is a positive integer having a value of from about 4 to about 6,
   said polyoxypropylene triamine having a molecular weight of about 320 to about 475 and said aqueous solution having an amine concentration of about 2.5 to about 3.5 meq/g.

2. A method as in claim 1 wherein the polyoxypropylene triamine has the formula:

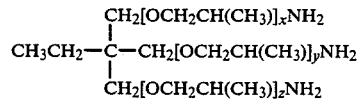

where x+y+z=5.3 and the average molecular weight is about 440.

3. In a method for the selective separation of carbon dioxide from a stream of acid gas composed of carbon dioxide and sulfur-containing acid gas components including hydrogen sulfide the improvement which comprises the steps of:

countercurrently contacting said gas stream in an absorption zone at a temperature within the range of about 20° to about 50° C. with a treating agent to thereby substantially selective remove a substantial portion of the carbon dioxide from said gas stream by absorption into said treating agent, discharging a gas stream from said absorption zone containing a significantly reduced amount of carbon dioxide and discharging said treating agent enriched with absorbed carbon dioxide from said absorption zone, charging said enriched treating agent to a desorption zone operated at a temperature within the range of about 80° to about 130° C. and desorbing carbon dioxide from said treating agent therein to provide an off-gas consisting essentially of carbon dioxide and regenerated treating agent for recycle to said abosorption zone, said treating agent consisting essentially of an aqueous solution containing from about 35 wt. % to about 55 wt. % of a polyoxypropylene triamine having the formula:

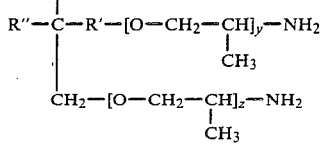

Wherein:
R' represents a methylene group and R" represents hydrogen or methyl or ethyl and wherein the sum of $x+y+z$ is a positive integer having a value of from about 4 to about 6,
said polyoxypropylene triamine having a molecular weight of about 320 to about 475 and said aqueous solution having an amine concentration of about 2.5 to about 3.5 meq/g.

4. A method as in claim 3 wherein the polyoxypropylene triamine has the formula:

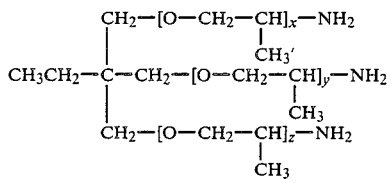

where $x+y+z=5.3$ and the averge molecular weight is about 440.

5. A method as in claim 4 wherein the treating agent consists of a 35 to 55 wt. % aqueous solution of said polyoxypropylene triamine.

* * * * *